United States Patent [19]

Brolin

[11] 4,271,509
[45] Jun. 2, 1981

[54] SUPERVISORY SIGNALING FOR DIGITAL CHANNEL BANKS

[75] Inventor: Stephen J. Brolin, Livingston, N.J.

[73] Assignee: Bell Telephone Laboratories, Incorporated, Murray Hill, N.J.

[21] Appl. No.: 57,333

[22] Filed: Jul. 13, 1979

[51] Int. Cl.³ .................................................. H04J 3/12
[52] U.S. Cl. ...................................................... 370/110
[58] Field of Search ............................. 370/110, 111; 179/18 FC, 18 FG

[56] References Cited

U.S. PATENT DOCUMENTS

| | | | |
|---|---|---|---|
| 3,909,540 | 9/1975 | Maryscuk | 370/110 |
| 3,922,495 | 11/1975 | Donohoe | 370/110 |
| 3,936,609 | 2/1976 | Waldeck | 370/110 |
| 3,970,799 | 7/1976 | Colton | 370/110 |
| 4,059,731 | 11/1977 | Green | 370/110 |

OTHER PUBLICATIONS

Bell Laboratories Record; Aug. 1972; "The D3 Channel Bank" by Gaunt et al.; pp. 229-233.
Bell System Technical Journal; vol. 51, Oct. 1972; "D2 Channel Bank; Digital Functions" By Cirillo et al.; pp. 1701-1712.
Bell Laboratories Record; Mar. 1977; "D4: Up-to-Date Channel Bank for Digital Transmission Plant" By Albert et al.; pp. 67-72.

Primary Examiner—David L. Stewart
Attorney, Agent, or Firm—Robert O. Nimtz

[57] ABSTRACT

A digital transmission system is disclosed in which time slots in selected frames are reserved for supervisory signaling bits. These signaling bits can be used to represent a large number of supervisory states by assigning at least three bit patterns to each of two interleaved streams of supervisory bits. These bit patterns may include, for example, continuous ones, continuous zeros and alternating ones and zeros. A supervisory state encoder and decoder for these bit patterns are disclosed.

10 Claims, 5 Drawing Figures

SUPERVISORY SIGNALING FOR DIGITAL CHANNEL BANKS

BACKGROUND OF THE INVENTION

1. Field of the Invention

This invention relates to digital transmission systems and, more particularly, to supervisory signaling in such digital transmission systems.

2. Description of the Prior Art

It is well-known to utilize digital transmission techniques in the telephone plant. Digital systems of this type, using pulse code modulation (PCM), have been used in interoffice trunks to accommodate 24 voice frequency channels on two pairs of twisted wires. Such a transmission system, called the D3 channel bank, is disclosed in J. H. Green et al U.S. Pat. No. 4,059,731, issued Nov. 22, 1977.

Digital transmission systems must provide extra bits for forming and supervising the overall digital signal. The system described in the Green et al patent utilizes a "pulse borrowing" technique in which the least significant bit of every sixth PCM word in each channel is utilized to transmit supervisory signaling information for the associated channels. The slight degradation of the voice signal resulting therefrom is virtually unnoticeable and yet the arrangement provides a supervisory signaling channel for each voice channel which is adequate for standard supervisory signals (off-hook, dial pulsing, etc.).

The digital pulse stream for such digital transmission systems consists of 24 eight-bit words and one framing bit for each frame of the digital signal. Each of the 24 data words is a PCM representation of a voice frequency signal and the least significant bit (i.e., the eighth bit) of each channel is periodically dedicated for signaling purposes. That is, every sixth frame includes supervisory signaling bit positions in the eighth bit position of each word. In addition, a framing bit position (once each frame) contains a framing pattern (in successive frames) which is used to frame the overall digital pulse stream and thereby permit the recovery of the supervisory bits as well as the PCM words.

The supervisory framing pattern in the Green et al patent uses framing bits in alternate frames to transmit a succession of three zeros followed by three ones, followed by three zones, etc. Two supervisory frames can be identified in such a framing scheme, one following the transition of the framing pattern from a zero to a one (the A bit) and one following the transition of the framing pattern from a one to a zero (the B bit). The A and B bits thus derived can be used to transmit continuous supervisory states by forcing either of these bit positions to contain continuous one or continuous zeros. The four possible combinations of the two-state A and B bits in these two positions are used to represent four unique and distinct supervisory states.

In prior art applications of such a digital transmission system, the A and B bits are used to represent supervisory states which must be transmitted between telephone central offices in order to control the setting up and taking down of the telephone connections. The four possible supervisory states were adequate for this purpose.

If such a digital transmission system is utilized in the subscriber loop plant, it is possible to take advantage of the same digital circuit technology and, indeed, many of the same digital circuits themselves for this application. Unfortunately, however, transmission in the subscriber loop plant requires a much larger number of supervisory states. Multiparty ringing signals, for example, and coin station control signals involve a larger number of supervisory states. While it is possible to derive such a larger number of supervisory states by borrowing additional voice bits, this arrangement has the disadvantage of further impairing the voice signals. Another proposal, i.e., substituting a data channel for the signaling bits, produces a nonstandard signal format and thereby introduces a basic incompatibility between the existing digital network and the subscriber loop applications of the digital T-type transmission systems.

SUMMARY OF THE INVENTION

In accordance with the illustrative embodiment of the present invention, the existing supervisory channel (the A and B bits) are coded in a new format which permits additional supervisory states to be transmitted without degrading or displacing the existing voice frequency signaling channels. In particular, each of the A and B bit positions is capable of assuming any one of three states, including the prior art all zeros and all ones states, and a third new state consisting of alternating ones and zeros. Combining the A and B bit positions (each having three states) permits nine different signaling states to be transmitted on the same supervisory signaling channel.

The expanded supervisory signaling capabilities of the present invention are obtained without any further degradation of the voice frequency signals. In addition, the signaling technique proposed in the present invention is entirely compatible with the supervisory signaling scheme already extensively used in the digital transmission network.

DETAILED DESCRIPTION

Figure 1:
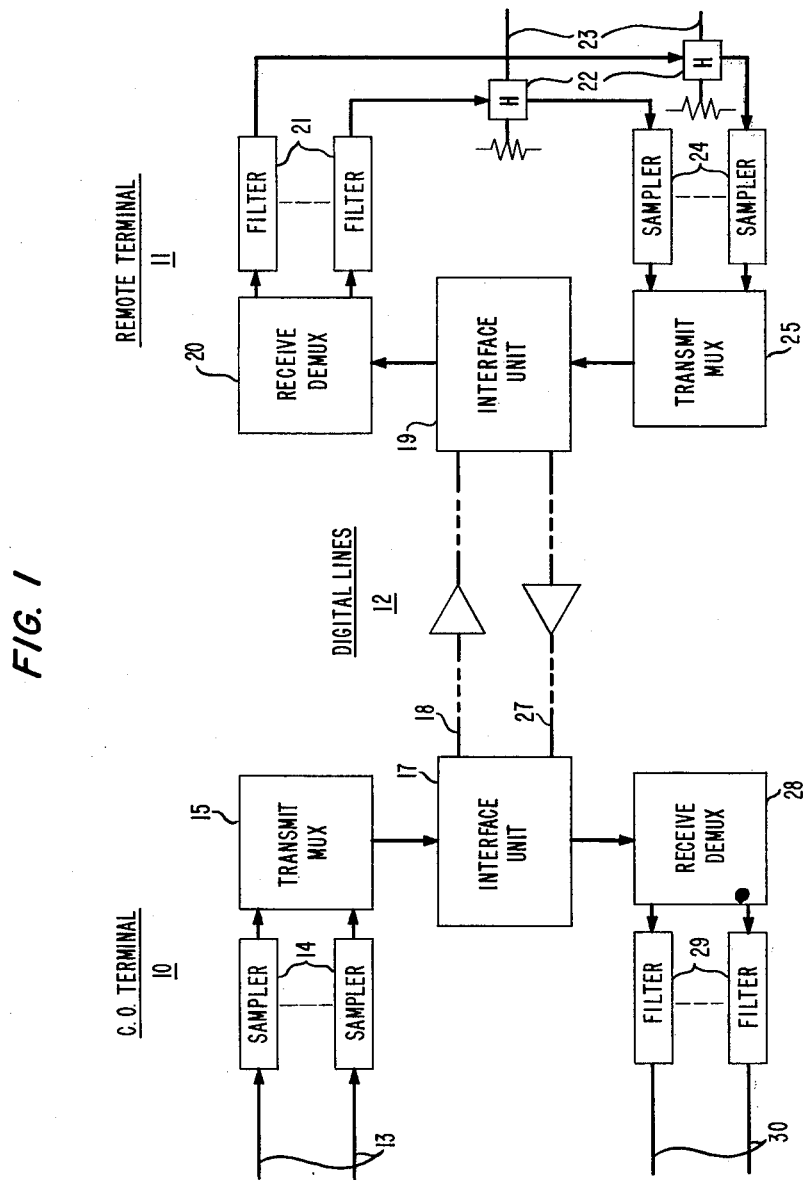
FIG. 1 is a general block diagram of a digital transmission system for application in a subscriber loop plant and capable of incorporating the expanded supervisory signaling capabilities of the present invention.

Referring more particularly to FIG. 1, there is shown a general block diagram of a digital transmission system for application in the subscriber loop plant. The digital transmission system of FIG. 1 comprises a central office terminal 10 and a remote terminal 11 connected together by a pair of repeatered digital lines 12. At central office terminal 10, a plurality of voice frequency lines 13 (24 for D-type channel banks) are each applied to a corresponding transmitting sampler unit 14. The sampler units 14 translate the voice frequency analog signals on lines 13 into pulse amplitude modulated (PAM)

samples which are applied to a transmit multiplexor 15. In multiplexor 15 the PAM samples are coded into eight-bit PCM signals and multiplexed in the format shown in FIG. 2. Framing and supervisory bits are added to the pulse stream in multiplexor 15. The combined digital pulse stream is applied to an interface unit 17, translated into bipolar format and launched on an outgoing digital line 18. Line 18 can be a repeatered line and thus extended for any desired distance to the remote terminal 11.

At the remote terminal 11, the digital line 18 is terminated in a interface unit 19. The bipolar signal format on line 18 is translated by interface unit 19 into a standard digital format which is applied to receive demultiplexor 20. Demultiplexor 20, under the control of timing signals recovered from the incoming pulse stream, converts the PCM code groups into pulse amplitude modulated samples and distributes the individual samples to a plurality of receiving filter units 21. The filter units 21 convert the PAM samples into continuous analog voice signals which are each applied to a hybrid circuit 22. The hybrid circuits 22 are connected by way of conductor pairs 23 to local subscriber telephone station sets.

Voice frequency signals from the subscriber station sets arrive at hybrids 22, are separated from the received signal and passed on to sampler units 24. Sampler units 24 translate the analog voice frequency signal into PAM signals which are applied to transmit multiplexor 25. Multiplexor 25 forms the PAM samples into eight-bit PCM code groups and multiplexes the PCM words into a pulse stream including framing and supervisory information. This pulse stream is applied to interface unit 19 where it is translated into a bipolar format for transmission on incoming transmission line 27. Transmission line 27 and transmission line 18 may be repeatered to increase the range over which the digital signal is transmitted.

At the central office terminal 10, the incoming pulse stream is applied to interface unit 17 where the bipolar format is translated into a standard binary signal which is applied to receive demultiplexor 28. Demultiplexor 28, under the control of timing signals recovered from the received pulse stream, demultiplexes the received pulse stream, converts the PCM words into PAM samples and applies the PAM samples to the appropriate ones of filter units 29. Filter units 29 translate the PAM samples into analog voice frequency signals on lines 30.

The transmitted and received voice frequency signals on lines 13 and 30 can be combined into a two-wire signal by the use of hybrids, as is done at remote terminal 11, to accommodate a two-wire switching facility. Alternatively, lines 13 and 30 can be switched directly in a four-wire switching facility. If, on the other hand, the central office terminal 10 is served by a digital switching machine, the bit streams themselves may be applied directly to the switching facility to permit switching to take place on a time division basis. Such a direct digital interface between the switching facility and the local subscriber signals obviates the need for the central office multiplexing and demultiplexing capability and thereby significantly reduces the cost of servicing subscriber loops with digital signal formats.

Figure 2:
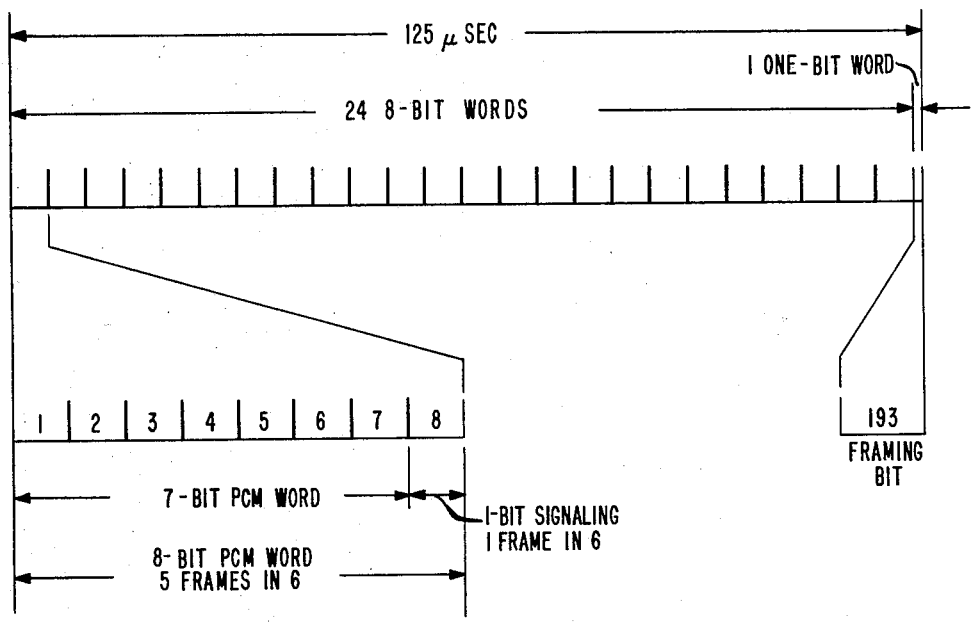
FIG. 2 is a graphical representation of a single frame of a standard digital signal useful in the system of FIG. 1.

In FIG. 2 there is shown a standard digital signal format, known as the DS1 signal, which is widely used in D-type channel banks interconnected by T-type transmission lines. As shown in FIG. 2, all eight bits of each channel word are used for carrying voice information in five of every six frames. In every sixth frame, the eighth bit position is borrowed for signaling purposes. Each signaling bit relates uniquely to a particular voice frequency channel and can be used for transmitting signaling information concerning the particular channel. All of the signaling bits for all of the channels occur in the same frame, which is therefore called the signaling frame and occurs every sixth transmission frame. Each of the A or B bit positions is available for signaling 667 times per second, which is adequate to transmit standard telephone supervisory signals such as off-hook, on-hook, dial pulsing, ringing control and coin station control.

The required framing information is transmitted in the 193rd pulse position of every frame. Odd numbered framing bits are used to frame the PCM words. Even numbered framing bits are used to locate the signaling frames. Thus, the odd numbered framing bits follow a framing pattern of alternating ones and zeros. These framing bits are used to demultiplex the pulse streams in receive demultiplexors 20 and 28. The even numbered framing bits contain a pattern of three successive ones followed by three successive zeros which is continuously repeated. Thus, every sixth frame can be identified by a transition in this signaling framing pattern from a zero to a one (the A bit) or a transition from a one to a zero (the B bit). This framing format is being used extensively in the D-type channel banks of the existing digital transmission network. The DS1 digital signal has been described in detail here for the purpose of illustrating the application of the present invention. It is apparent to those skilled in the art that the inventive concepts disclosed herein can be used in other digital transmission systems having different digital data formats.

Figure 3:
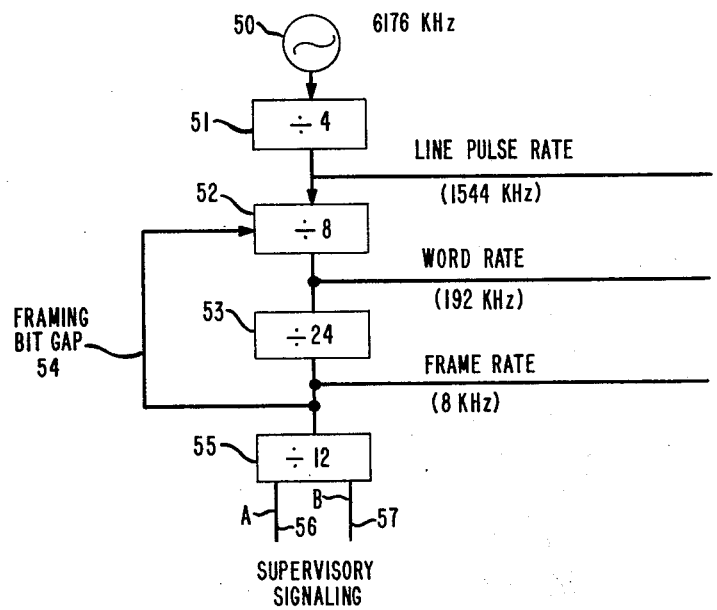
FIG. 3 is a general block diagram of a timing signal countdown chain useful for generating timing signals for operating the system of FIG. 1.

In FIG. 3 of the drawings there is shown a timing chain for timing the generation and detection of digital pulse streams such as that shown in FIG. 2. A crystal oscillator 50 generates a basic timing signal of 6176 kHz. This signal is divided by 4 in divider circuit 51 to provide a timing signal of 1544 kHz which is the basic pulse repetition frequency transmitted on digital lines 12 in FIG. 1. In receive demultiplexors 20 and 28, the 1544 kHz signal is recovered from the received pulse stream itself. When this line pulse rate is divided by 8 in divider 52, a PCM word rate signal is provided at 192 kHz. The signal is again divided by 24 in divider 53 to provide a framing rate signal at 8 kHz. The output of divider 53 is fed back by way of lead 54 to create a gap of one bit in each frame corresponding to the 193rd bit position. The output of divider 53 is applied to divider 55 which divides the frame rate by 12 to alternately provide timing signals for the A and B supervisory bits on leads 56 and 57, respectively. The timing signals of FIG. 3 are combined in accordance with well-known digital techniques to provide all of the basic timing information required to provide pulse streams of the form shown in FIG. 2 for use in a transmission system such as that shown in FIG. 1.

Figure 4:
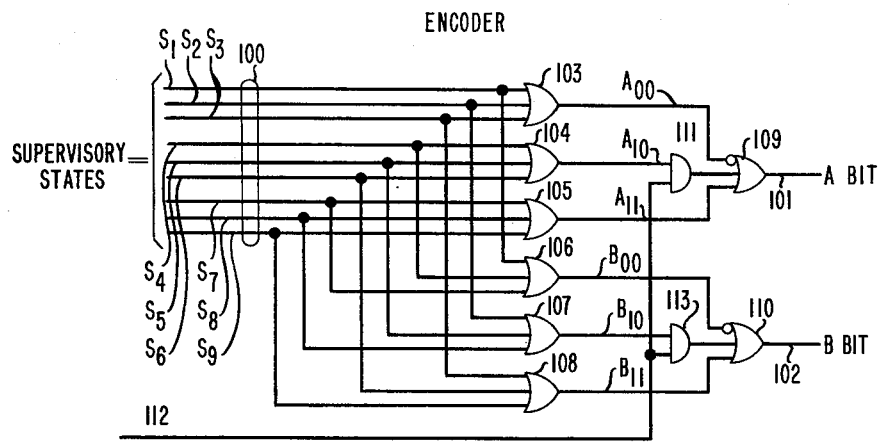
FIG. 4 is a detailed logic diagram of a supervisory state encoder in accordance with the present invention and useful in the system of FIG. 1.
Figure 5:
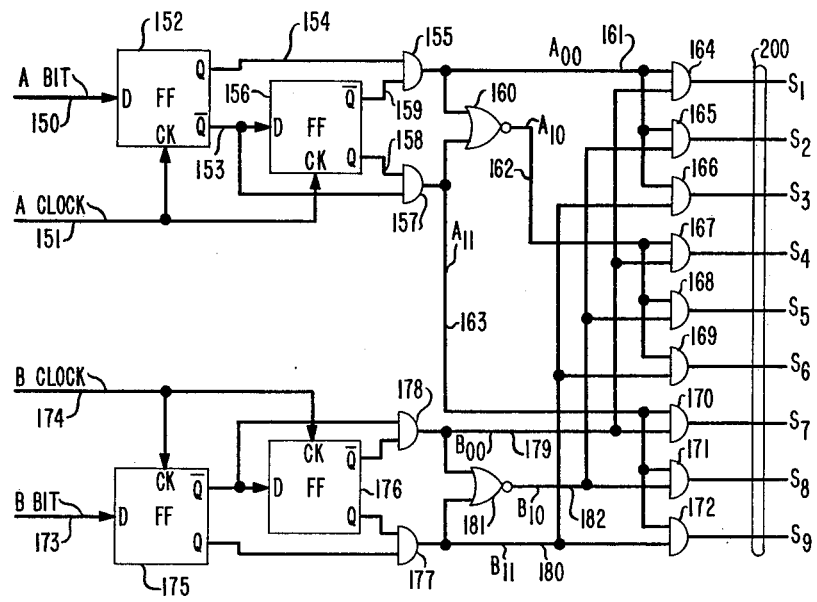
FIG. 5 is a detailed logic diagram of a supervisory state decoder in accordance with the present invention and useful in the system of FIG. 1.

In accordance with the present invention, each of the sampler units 14 and 24 of FIG. 1 includes a supervisory state encoder and each of filter units 21 and 29 include a supervisory state decoder. The encoders in sampler units 14 and 24 impress supervisory states on outgoing pulse streams and the decoders in filter units 21 and 29 recover these supervisory states from the pulse stream. An appropriate encoder circuit for such application is shown in FIG. 4. The corresponding decoder circuit is shown in FIG. 5.

Referring more particularly to FIG. 4, there is shown a detailed logic diagram of an encoder circuit which translates a plurality of supervisory state signals on leads 100 into A and B bit patterns on bus leads 101 and 102, respectively. The supervisory state signals are labeled in FIG. 4 with the numerals $S_1$ through $S_9$, indicating the possibility of nine unique and distinct supervisory states. The signals on these leads are each applied to inputs of two OR gates 103 through 108. Thus, the lead labeled "$S_1$" is connected to OR gates 103 and 106, the lead labeled "$S_2$" is connected to OR gates 103 and 107 and the lead labeled "$S_3$" is connected to OR gates 103 and 108. The remaining leads 100 are similarly connected to inputs of two different OR gates 103 through 108 as is obvious from inspection of FIG. 4.

The output of OR gate 103 is labeled "$A_{00}$" and corresponds to an A bit position occupied by a succession of zeros. The output of OR gate 104, labeled "$A_{10}$," corresponds to an A bit position containing alternate ones and zeros. The output of OR gate 105, labeled "$A_{11}$," corresponds to an A bit position occupied by a continuous succession of ones. Similarly, the output of OR gate 106, labeled "$B_{00}$," corresponds to a B bit position occupied by a sequence of zeros. The output of OR gate 107, labeled "$B_{10}$," corresponds to a B bit position occupied by alternating ones and zeros. Finally, the output of OR gate 108, labeled "$B_{11}$" in the drawing, corresponds to a B bit position containing successive ones. The output of OR gate 105 is applied through OR gate 109 to bus lead 101. Thus, whenever OR gate 105 is energized, a "1" output appears on bus lead 101 which, under the control of the A clocking signal shown in FIG. 3, can be gated into the A supervisory bit position each time that position appears in the pulse stream. Similarly, the output of OR gate 108 is applied through OR gate 110 to B bit bus lead 102 and can be gated into the pulse stream in B supervisory bit position under the control of a B timing signal as shown in FIG. 3.

The output of OR gate 103 is used to inhibit OR gate 109 and thus prevent the appearance of a one on A bit bus 101. Thus, when bus 101 is gated into the bit stream, a succession of zeros appears. Similarly, the output of OR gate 106 is used to inhibit OR gate 110, causing zeros to appear on bus 102 which are gated into the B bit position of the pulse stream. Alternatively, OR gates 103 and 106 can be entirely omitted, together with the inhibit inputs to OR gates 109 and 110, since the failure to provide any ones to OR gates 109 and 110 will automatically result in the transmission of all zeros in the signaling bit positions.

The output of OR gate 104 is applied to AND gate 111. The other input to AND gate 111 is a clock signal on lead 112 having a repetition rate which is one-half the repetition rate of the A and B bits themselves. Thus, AND gate 111 is enabled for half the time and disabled for the other half of the time. The output of AND gate 111 is applied through OR gate 109 to A bus 101. Thus, when bus 101 is gated in the A bit position, alternate ones and zeros will be transmitted in the A bit position. The output of OR gate 107 is similarly applied to one input of AND gate 113, the other input of which is applied with the same clock signal on lead 112. The output of AND gate 113 is applied through OR gate 110 to B bus 102, thereby causing alternate ones and zeros to be gated in the B bit position.

It is to be understood that the supervisory states represented on input leads 100 may represent any desired information which is to be transmitted through the digital transmission system of FIG. 1. While these supervisory states may well be concerned with the condition of the terminal equipment (alarm states) or with testing procedures (test states), they are particularly advantageous for use in a subscriber loop application in transmitting such supervisory states as multiparty ringing control signals or control signals for coin station sets. If the supervisory states are chosen carefully so that the four basic supervisory states encoded by the all ones and the all zeros signals correspond to the prior art supervisory states, then the system of encoding of FIG. 4 will be entirely compatible with the signaling taking place in the existing digital network. The new states provided by the increased ability to encode either the A or the B bit as alternating ones and zeros can then be used to encode five additional states. These states can, for example, represent superimposed ringing of either polarity on either lead, or can represent coin collect and coin return signals in coin station services.

In FIG. 5 there is shown a logic diagram of a decoder circuit suitable for encoding the supervisory states generated in the encoder of FIG. 4. In FIG. 5 the signal on lead 150 corresponds to the signals appearing in the A bit positions in a received pulse stream. These A bits are segregated from the pulse stream by the received demultiplexor 20 or 28 in FIG. 1. An A clock signal is provided on lead 151 in synchronism with the A bit pulse positions. This clock signal is derived by well-known timing recovery techniques and timing chains such as that shown in FIG. 3.

Lead 150 is connected to the D input of flip-flop 152. Pulses appearing on lead 150 either set or reset flip-flop 152. When set, flip-flop 152 provides an output on lead 153 and, when reset, the output is removed from lead 153 and appears on lead 154. Lead 154 is connected to one input of AND gate 155. Lead 153 is connected to the D input of flip-flop 156 and one input of AND gate 157. The transitions of flip-flops 152 and 156 are under the control of the clock signal appearing on lead 151.

Flip-flop 156 assumes states in response to changes in the signal on lead 153. When set, flip-flop 156 provides an output on lead 158 which is applied to the remaining input of AND gate 157. When flip-flop 156 is reset, the output is removed from lead 158 and an output appears on lead 159 connected to the remaining input of AND gate 155. An output from AND gate 155 on lead 161 indicates that the received A bits are successive zeros and hence has been labeled "$A_{00}$" to correspond with that state in FIG. 4. The output of AND gate 157 on lead 163 indicates the reception of a succession of ones in the A bit position and thus is labeled "$A_{11}$." The outputs of AND gates 155 and 157 are combined in NOR gate 160, the output of which is labeled "$A_{10}$" on lead 162 and indicates the reception of alternating ones and zeros in the A bit position.

$A_{00}$ lead 161 is connected to one input of each of AND gates 164, 165 and 166. The remaining inputs to these AND gates are derived from the received B bits. Similarly, $A_{10}$ lead 162 provides one input to AND gates 167, 168 and 169 while $A_{11}$ lead 163 provides one input to AND gates 170, 171 and 172. The remaining inputs to all of these AND gates 164 through 172 are derived from the information detected in the B bit position.

The signals in the B bit position are supplied on lead 173 along with a B position clock on lead 174. Lead 173 is connected to the "D" input of flip-flop 175, the $\overline{Q}$ output of which is applied to the "D" input of flip-flop 176. State changes of flip-flops 175 and 176 are under the control of clock signals on lead 174. The "1" output of flip-flop 175 is applied to AND gate 177 while the "0" output of flip-flop 175 is applied to AND gate 178. The corresponding outputs of flip-flop 176 are connected respectively to the remaining inputs of AND gates 177 and 178.

An output of AND gate 178 on lead 179 indicates the reception of the all zeros pattern in the B bit position and hence lead 179 is labeled "$B_{00}$." Similarly, an output from AND gate 177 on lead 180 corresponds to the reception of an all ones pattern in the B bit position and hence lead 180 is labeled "$B_{11}$." The outputs of AND gates 177 and 178 are combined in NOR gate 181 to provide an output on lead 182 identified as $B_{10}$ which represents the reception of alternating ones and zeros in the B bit position. Lead 179 is connected to the remaining inputs of AND gates 164, 167 and 170. Lead 182 is connected to the remaining inputs of AND gates 165, 168 and 171. Lead 180 is connected to the remaining inputs of AND gates 166, 169 and 172. The outputs of AND gates 164 through 172 on leads 200 correspond to the same numbered supervisory states on leads 100 in FIG. 4. The signals on leads 200 can therefore be used to indicate the appropriate supervisory states at the receiving terminals. These signals may be used, for example, to operate a relay which carries out an appropriate supervisory function such as ringing or coin return. They may, however, be used for any other purpose including testing and alarming at that terminal.

It will be noted that a supervisory channel of increased capacity has been provided in both directions between the central office terminal 10 and the remote terminal 11 of the digital transmission system in FIG. 1. The supervisory states which must be signaled in one direction need not correspond to the supervisory states transmitted in the other direction. Thus, multiparty ringing control signals and coin station control signals can be transmitted from the central office terminal to the remote terminal while various alarm states or test results states can be transmitted from the remote terminal to the central office terminal. The increased supervisory signaling capability provided by the present invention can therefore be used for any purpose which is found useful in the particular application of the transmission system.

I claim:

1. In a digital transmission system in which information signals are transmitted as a serial pulse stream and in which regularly recurring time slots of said pulse stream are reserved for supervisory signaling, a supervisory state signaling system
    characterized by
    means for utilizing alternate supervisory time slots to represent one bit position of a two bit position supervisory signaling channel,
    means for assigning any one of at least three bit patterns to said one bit position, and
    means for combining bit patterns in said alternate and in intermediate supervisory time slots to represent a plurality of distinguishable supervisory states.

2. The combination according to claim 1 wherein said assigning means is further
    characterized by
    means for generating bit patterns comprising continuous ones, continuous zeros and alternating ones and zeros.

3. The combination according to claim 1 further
    characterized by
    a source of more than four supervisory state indicating signals at one end of said digital transmission system, and
    means for deriving more than four supervisory state control signals at the other end of said digital transmission system.

4. The combination according to claim 1
    characterized in that
    said serial pulse stream is divided into a plurality of frames of successive pulse positions,
    means for encoding signals from a plurality of information signal sources in each of said frames, and
    means for reserving supervisory pulse positions in at least some of said frames.

5. The combination according to claim 4 further
    characterized in that
    said supervisory pulse positions represent said information signals in some of said frames and represent supervisory signals in others of said frames.

6. The combination according to claim 5 further
    characterized in that
    said supervisory pulse positions are occupied by said supervisory signals in every sixth one of said frames.

7. A supervisory state signaling system for digital transmission systems
    characterized by
    means for reserving selected pulse positions in said transmission system for supervisory signaling bits, and
    means for selectively assigning one of at least three distinct bit patterns representing different signaling states to said selected pulse positions.

8. The supervisory state signaling system according to claim 7 further
    characterized in that
    successive reserved pulse positions are allocated to a plurality of interleaved signaling pulse positions, and
    means for independently assigning said bit patterns to different ones of said interleaved pulse positions.

9. The supervisory state signaling system according to claim 7 further
    characterized in that
    said three distinct bit patterns comprise continuous ones, continuous zeros and alternating ones and zeros.

10. The supervisory state signaling system according to claim 7 further
    characterized by
    a source of supervisory state indicating signals at one end of said digital transmission system,
    means for utilizing supervisory state control signals at the other end of said digital transmission system, and
    means responsive to said indicating signals for controlling said assigning means.

* * * * *

UNITED STATES PATENT AND TRADEMARK OFFICE
CERTIFICATE OF CORRECTION

PATENT NO. : 4,271,509
DATED : June 2, 1981
INVENTOR(S) : Stephen J. Brolin

It is certified that error appears in the above—identified patent and that said Letters Patent is hereby corrected as shown below:

Column 3, line 12, "a" should read --an--.
Column 6, line 22, "encoding" should read --decoding--.
Column 8, line 43, "to" should read --into--.

Signed and Sealed this

Twenty-seventh Day of April 1982

[SEAL]

Attest:

GERALD J. MOSSINGHOFF

Attesting Officer

Commissioner of Patents and Trademarks